Jan. 20, 1959   C. T. ISLEY, JR   2,870,414
SUPPRESSED CARRIER MODULATOR
Filed Nov. 7, 1956
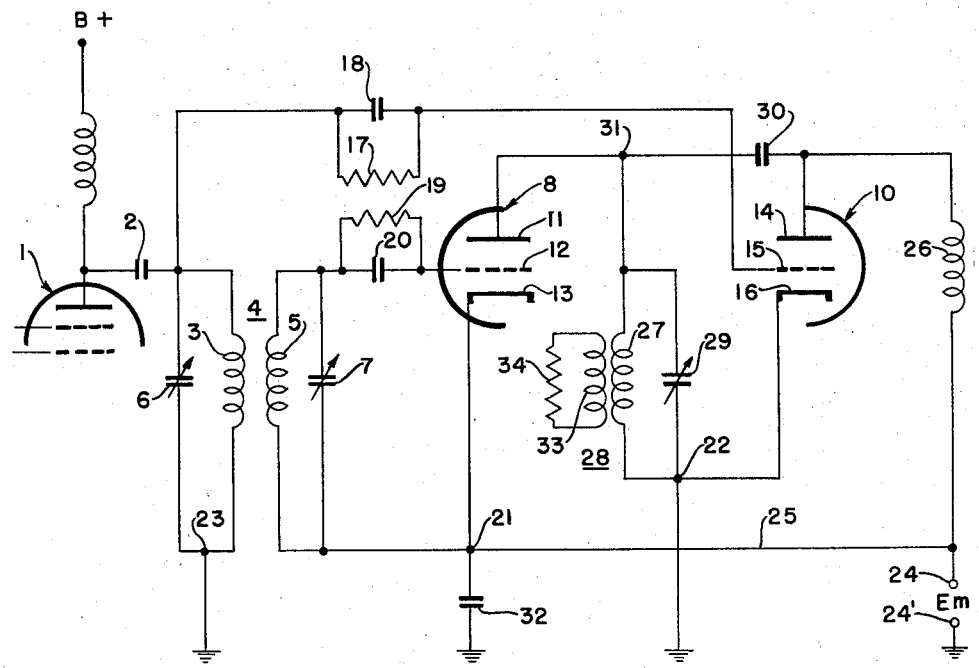
INVENTOR
CARY T. ISLEY JR.
BY
ATTORNEY United States Patent Office 2,870,414
Patented Jan. 20, 1959

2,870,414

SUPPRESSED CARRIER MODULATOR

Cary T. Isley, Jr., Los Angeles, Calif., assignor to The Martin Company, a corporation of Maryland Application November 7, 1956, Serial No. 620,849

8 Claims. (Cl. 332—44)

This invention relates to electric current modulators and particularly to a modulator which suppresses the carrier component of the modulated wave.

So-called "balanced modulators" are conventionally employed to modulate a relatively high-frequency electric current in accordance with the variations in frequency and amplitude of a signal representative of information or intelligence to be transmitted. The principal advantage obtained from the use of a balanced modulator is that certain components of the modulated wave may be eliminated or suppressed prior to the transmission of the intelligence. For example, suppression of the carrier component of one electromagnetic wave permits the transmission of the same amount of useful energy with greater efficiency than can otherwise be realized.

To operate properly, a true balanced modulator circuit must be kept accurately in balance and not be permitted to drift with respect to initial amplitude balance. Moreover, some types of balanced modulators have a strong tendency to be unstable due to feedback unintentionally introduced into the circuit.

I have invented a new type of electric current modulator which provides the functional advantages of a balanced modulator without the use of a conventional balanced circuit. According to my invention I utilize two vacuum tubes of the type having at least one control grid. A carrier frequency voltage of a suitable amplitude and fundamental frequency is applied to the control grid of each of the tubes in such manner that the voltage applied to the grid of one tube is 90 degrees out of phase with the voltage applied to the grid of the other tube. The two tubes are provided with a common load impedance which is tuned to the second harmonic frequency of the carrier voltage. A modulating voltage, varying in frequency and amplitude in accordance with the intelligence to be transmitted, is injected into the plate-cathode circuits of the two tubes in such manner that, during positive excursions of the modulating voltage, the plate of one tube is made positive with respect to its cathode while the plate of the second tube is made negative with respect to its cathode. During a positive excursion of the modulating voltage, the former tube is operative to modulate the alternating current impressed on its grid and the latter is inoperative. On the other hand, negative excursions of the modulating voltage reverse the situation so that the plate of the previously operative tube becomes negative with respect to its cathode. Now the first tube is inoperative. Furthermore, the plate of the previously inoperatively tube becomes positive with respect to its cathode and the second tube is operative. In such an arrangement the initial relative phase displacement of the grid voltages combined with the phase inverting action of the tubes themselves makes the currents of second harmonic frequency 180 degrees out of phase in the plate circuits of the tubes. Thus, without the use of any balanced type circuit, balanced modulator action is obtained. Moreover, by very simple means my new modulator circuit permits the carrier frequency oscillator to operate at only one half the frequency of the final modulated currents, thus minimizing the transfer of carrier signal energy into the output circuits by such media as grid-plate capacities.

In the following specification I describe a particular embodiment of my invention. In the course of the specification reference is made to the accompanying drawing which is a schematic diagram of electric signal modulation apparatus.

In the drawing there is illustrated at 1 the tube of a suitable oscillator circuit for supplying the continuous electric signal of a predetermined fundamental frequency which I shall designate the carrier signal. The A. C. voltage produced by the oscillator is coupled through a capacitor 2 to the primary winding 3 of a transformer 4. The secondary of the transformer is indicated at 5. The two windings of the transformer are tuned to the fundamental frequency of the oscillator by variable capacitors 6 and 7, respectively. Preferably, the primary and secondary windings of transformer 4 are electrically identical and are critically coupled so that the voltage developed in the secondary winding will be essentially equal in amplitude and 90 degrees out of phase with the primary voltage. They should be designed to have Q's which are as high as practicable. All of these conditions can be met with conventional techniques well known to those skilled in the art.

A pair of vacuum tubes 8 and 10 are utilized to perform the modulating function. These tubes may be triodes, the tube 8 having an anode or plate 11, a grid 12 and a cathode 13, and the tube 10 having an anode or plate 14, a grid 15 and a cathode 16.

The voltage developed across the primary winding 3 of the transformer 4 is connected to the grid 15 of the tube 10 through a grid-leak bias combination comprising the resistance 17 and capacitor 18 connected in parallel. In like manner, the voltage developed across the secondary 5 of the transformer is applied to the grid 12 of the tube 8 through a grid-leak bias combination comprising the resistance 19 and the capacitor 20. The grid-cathode circuit of the tube 8 is completed through the connection from the cathode 13 to the bottom end of the secondary 5 at the junction 21 whereas the grid-cathode circuit, tube 10, is completed by connecting the cathode 16 to ground at 22 and the bottom end of the primary 3 to ground at 23. The values of the components associated with tubes 8 and 10 are selected so that the latter will operate substantially as Class "C" amplifiers.

A modulating potential, $E_m$, is applied across the terminals 24 and 24' by any suitable means. The amplitude of this signal is made to vary around ground potential. The terminal 24 is connected to the plate 14 of tube 10 through a radio frequency choke 26 designed to present a high impedance to frequencies on the order of the fundamental frequency, $f_1$, or greater, but to present a relatively low impedance throughout the band width of the modulating voltage. As previously stated, the cathode 16 of the tube 10 is connected to ground. Thus, whenever the modulating voltage is positive with respect to ground the plate 14 of triode 10 will be positive with respect to cathode and, therefore, the tube, operating as a Class "C" amplifier, will be operative.

The modulating voltage, $E_m$, is applied to the triode 8 by the following circuit. The terminal 24 is connected through the conductor 25 to the cathode 13 of triode 8 at the junction 21 while the terminal 24' is connected through ground to junction 22 and the lower end of primary winding 27 of output transformer 28. The other end of winding 27 is connected at 31 to the plate 11 of the triode 8.

Capacitance 32, connected between the junction 21 and ground, maintains the cathode 13 above ground potential with respect to modulating signals. Therefore, when the instantaneous polarity of the modulating voltage, $E_m$, is positive with respect to ground, so that the tube 10 is conductive, the plate 11 of triode 8 will be at ground potential which is negative with respect to the potential on cathode 13. It follows that the triode 8 is inoperative under these conditions.

On the other hand, when the instantaneous polarity of $E_m$ makes terminal 24' positive with respect to terminal 24, the potential of the plate 11 will be positive with respect to cathode 13 and the triode 8 will then be operative. It is clear from the foregoing discussion that the triode 10 becomes inoperative at the same time inasmuch as the potential of plate 14 will be negative with respect to the cathode 16.

The load circuit for the tubes 8 and 10 comprises the parallel tuned circuit made up of the primary winding 27 of output transformer 28 and the tuning capacitor 29. This tuned circuit is coupled to the plate 14 of triode 10 through the coupling capacitance 30 connected between the plate 14 and the junction 31. The capacitance 30 has a value which presents a high impedance to modulating signal frequencies but presents a low impedance to frequencies on the order of $f_1$ or greater. The tuned circuit is connected back to the cathode 16 at the junction 22.

Now, because the load circuit is tuned to the second harmonic of the carrier frequency, $f_1$, it will discriminate against the frequency $f_1$ and will be selective with respect to the second harmonic frequencies which are modulated in accordance with the amplitude and frequency of the voltage $E_m$. As previously stated, the voltages applied to the grids 12 and 15 of the triodes are 90 degrees out of phase due to the critical coupling of the transformer 4. This difference in phase combined with the phase inversion effected by each of the triodes 8 and 10 causes the currents of second harmonic frequency in the plate circuits to be 180 degrees out of phase so that that component of the modulated wave appearing in the tuned load circuit is suppressed, leaving only the side band components of the modulated wave which may be coupled to a utilization circuit represented by the secondary winding 33 of transformer 28 connected in series with a load impedance represented by the resistance 36. This suppression of the second harmonic carrier component of the modulated wave, leaving only the side bands, is equivalent to balanced modulator action. However, it will be recognized by those skilled in the art that my new modulator circuit does not rely on any aspect of the conventional balanced modulator circuits. Moreover, critical adjustment of components required to maintain proper operation of a balanced modulator is eliminated.

Two possible causes of improper operation of my new circuit may be easily avoided in the initial design of a circuit embodying my invention. Direct coupling of fundamental frequency current from the oscillator into the tuned load circuit, may occur through the grid-plate capacities of the triodes 8 and 10. This is easily avoided simply by selecting a tube type which presents a relatively high grid-plate capacitive reactance at the frequencies involved and by using components in the plate-load tuned load circuit which have reasonably high Q.

A second source of improper operation may be the direct coupling of second harmonic frequency voltages through the grid-plate capacities of triodes 8 and 10 due to grid current flow. This undesirable effect may be minimized in the initial design of the circuit merely by arranging the tuned primary and secondary circuits of the transformer 4 to have as low L/C ratios as are practicable and consistent with providing sufficient excitation to the grids 12 and 15 of triodes 8 and 10, respectively.

With the foregoing considerations in mind it is a relatively simple matter to design my new modulator circuit so that the undesirable effects are avoided. It will be found that neither effect presents continuing problem during the lifetime of the modulator as do some of the adjustments required to compensate for the drift which is characteristic of conventional balanced modulator circuits.

In the foregoing specification I have described a complete and practical embodiment of my invention. The details given in the course of that description are not to be construed as limitations of the scope of the invention but are merely given for purposes of illustrating this embodiment. The scope of the invention is defined by the subjoined claims.

I claim:

1. Modulation apparatus which comprises, in combination, first and second electron discharge devices each having at least an anode, a grid and a cathode, sources of alternating current potentials having the same predetermined frequency and being substantially in phase quadrature, lumped constant circuits for impressing the potential of one of said sources on the grid of said first device and for impressing the potential of the other of said sources on the grid of the second of said devices, a source of modulating potential, and a load impedance tuned to a frequency twice the said predetermined frequency, said modulating source and said load impedance being connected in the anode circuit of said first device such that that device is conductive during positive excursions of the modulating potential, and said modulating source and load impedance being connected in the anode circuit of said second device such that that device is conductive during negative excursions of the modulating potential.

2. Modulation apparatus which comprises, in combination, first and second electron discharge devices each having at least an anode, a grid and a cathode, a source of alternating current potential having a predetermined frequency, lumped constant circuit means for deriving from said source potentials which are substantially in phase quadrature, means for impressing one of said derived potentials on the grid of said first device and for impressing the other of said derived potentials on the grid of said second device, a source of modulating potential, and a load impedance tuned to a frequency twice the said predetermined frequency, said modulating source and said load impedance being connected in the anode circuit of said first device such that that device is conductive during positive excursions of the modulating potential, and said modulating source and load impedance being connected in the anode circuit of said second device such that that device is conductive during negative excursions of the modulating potential.

3. Modulation apparatus according to claim 2 in which the lumped constant circuit means for deriving potentials is a transformer having critically coupled primary and secondary windings and one of the derived potentials is obtained from the primary winding and the other derived potential is obtained from the secondary winding.

4. Modulation apparatus which comprises, in combination, a source of alternating current of predetermined fundamental frequency, a transformer having primary and secondary circuits tuned to the fundamental frequency, said source being connected to energize said primary circuit, first and second thermionic amplifying tubes each having at least a plate, a grid and a cathode, a grid-cathode circuit for said first tube comprising the tuned primary winding of said transformer and a grid-cathode circuit for said second tube comprising the tuned secondary winding of said transformer, means in each grid circuit for biasing the tubes to Class "C" operation, a load impedance tuned to the second harmonic frequency of the carrier current, and a source of modulating potential, a plate-cathode circuit for each tube comprising the load impedance and the source of modulating potential with the latter source being connected in opposite phase in the plate-cathode circuit of said first tube with respect to its connection in the plate-cathode of said second tube, whereby an amplitude modulated current of second harmonic frequency is developed in said load impedance.

5. Modulation apparatus which comprises, in combination, a source of alternating current of predetermined fundamental frequency, a transformer having primary and secondary circuits tuned to the fundamental frequency, said source being connected to energize said primary circuit, first and second thermionic amplifying tubes each having at least a plate, a grid, and a cathode, a grid-cathode circuit for one of said tubes comprising the tuned primary winding of said transformer and a grid-cathode circuit for the other of said tubes comprising the tuned secondary winding of said transformer, a load impedance tuned to the second harmonic frequency of the carrier current, and a source of modulating potential, a plate-cathode circuit for each tube comprising the load impedance and the source of modulating potential connected so that one of the tubes is operative only during the positive excursions of modulating potential and the other of the tubes is rendered operative only during negative excursions of modulating potential, whereby an amplitude modulated current of second harmonic frequency is developed in said load impedance.

6. Modulation apparatus which comprises, in combination, a source of alternating current of predetermined fundamental frequency, a transformer having primary and secondary circuits tuned to the fundamental frequency, said source being connected to energize said primary circuit, first and second thermionic amplifying tubes each having at least a plate, a grid and a cathode, a grid-cathode circuit for one of said tubes comprising the tuned primary winding of said transformer and a grid-cathode circuit for the other of said tubes comprising the tuned secondary winding of said transformer, a load impedance tuned to the second harmonic frequency of the carrier current, and a source of modulating potential, a common load circuit for the tubes which circuit comprises the load impedance, and means for connecting the source of modulating potential to the plate of each tube the modulating potential of the plate of one tube being in phase opposition to the modulating potential at the plate of the other tube so that one of the tubes is operative only during the positive excursions of modulating potential and the other of the tubes is rendered operative only during negative excursions of modulating potential, whereby an amplitude modulated current of second harmonic frequency is developed in said load impedance.

7. Modulation apparatus which comprises, in combination, a source of radio frequency potential of predetermined frequency and a source of modulating potential, a transformer having primary and secondary windings, said primary winding being energized by said radio frequency source, means for tuning said primary and secondary windings so that the secondary is critically coupled to the primary at the predetermined frequency, a pair of vacuum tubes each having at least a cathode, a control grid and a plate, a grid-cathode circuit for one of said tubes including the tuned primary circuit of said transformer and means for biasing said one tube to operate substantially as a Class "C" amplifier, a grid cathode circuit for the other of said tubes including the tuned secondary circuit of said transformer and means for biasing said other tube to operate substantially as a Class "C" amplifier, a load circuit for each of said tubes, said load circuits for both tubes comprising a common load impedance tuned to the second harmonic of the predetermined frequency of the radio frequency source, and a circuit for connecting the source of modulating potential in the plate-cathode circuit of each of said tubes such that the modulating potential applied to the plate of said one tube is in opposite phase to the modulating potential applied to the plate of said other tube, whereby a modulated potential having a frequency corresponding to the second harmonic of the predetermined frequency is developed in the tuned load impedance.

8. Modulation apparatus according to claim 7 in which said common load impedance and said source of modulating potential are serially connected in the plate cathode circuit of each of said tubes.

References Cited in the file of this patent

UNITED STATES PATENTS

| | | |
|---|---|---|
| 1,773,116 | Potter | Aug. 19, 1930 |
| 2,485,560 | Burroughs | Oct. 25, 1949 |